United States Patent [19]

Okada

[11] Patent Number: 4,573,926

[45] Date of Patent: Mar. 4, 1986

[54] BRAILLE PRINT BOARD

[76] Inventor: Chozo Okada, 23-20, Yagiyamahoncho 1-chome, Sendai-shi, Miyagi-ken, Japan

[21] Appl. No.: 688,142

[22] Filed: Dec. 31, 1984

[51] Int. Cl.[4] ............................................. G09B 21/02
[52] U.S. Cl. .................................................... 434/115
[58] Field of Search ........................ 434/113, 114, 115

[56] References Cited

U.S. PATENT DOCUMENTS 3,132,962  5/1964  Seymour ............................ 434/113

FOREIGN PATENT DOCUMENTS 1042166  6/1953  France ............................... 434/113

OTHER PUBLICATIONS

Gunji Wada, "Braille Points Duplication Method", Xerox Disclosure Journal, vol. 1, No. 5, May 1976.

Primary Examiner—Harland S. Skogquist
Attorney, Agent, or Firm—Wenderoth, Lind & Ponack

[57] ABSTRACT

A braille print board having a plurality of sets of six-dot holes for forming braille letters, a retaining sheet on one side of the print plate and a dot hole sheet on the other, the dot hole sheet and the retaining sheet having braille letters in the form of punctures in the dot hole sheet and depressions in the retaining sheet aligned with the holes and formed with a braille typewriter or braille pen, balls in the holes, through the punctures, and a cover sheet pasted over the dot hole sheet so as to prevent the balls from dropping out of the holes. In another embodiment, the balls are disposed in a ball supply plate between the print plate to which the retaining plate is fixed and a ball supply plate, and the braille pen or braille typewriter presses the balls from the holes in the ball supply plate into depressions formed thereby in the retaining plate.

4 Claims, 11 Drawing Figures

BRAILLE PRINT BOARD

BACKGROUND OF THE INVENTION

1. Field of the Invention

The present invention relates to a braille print board.

2. Prior Art

When writing braille in the conventional manner, a braille printer comprising a tablet, a scale and a pen or a braille typewriter is used to project the braille letters from the back of a sheet of paper in horizontal lines from right to left. When reading braille text, one touches the raised points with the index finger successively from left to right. Although the above mentioned braille typewriter and braille stereotype printer have been available for some time, their high prices have limited their wide-spread use. Thus, blind people had to continue being dependant on the hand-made copies offered by volunteer braille writers.

Printing in braille is achieved by printing braille letters on lines equally spaced apart, and then printing on the back, of the sheet between the lines of the front side, so that the sheets are printed on both sides with braille letters. Printing using the braille stereotype printer was therefore cumbersome in that the sheet of paper printed on the front first had to be reversed for printing on the back between the lines of braille letters formed on the front of the paper.

As the braille stereotype of the above method could not be used repeatedly, this increased the volume of transcription to braille if the number of copies to be issued was to be increased.

The inventor of the present application proposed an improved stereotype in his prior inventions disclosed in Japanese Patent Application laid open under No. Sho-57-43894 and Utility Model Application laid open under No. Sho 58-48436. While the braille stereotype did improve workability of the conventional method, there still remained problems for the braille writers.

Of the above mentioned prior art, the former method used a plastic board having the same thickness as the projection height of a braille letter, formed continuous lines of holes for braille letters, one cell of six dots corresponding to the eye of the braille letter representing one character, adhered an adhesive tape over the line, and placed hard balls inside said braille letters to thereby cause respective 6-dot cells (one letter) to represent one braille letter. Alternatively, balls are retained by utilizing the adhesive force of the tape, and then balls not needed are removed. The latter invention adhered the tape over the dot cells of the braille board to retain the balls in the dot cells, and removed unneeded dot balls through the adhesive tape.

In order to remove the balls from the cells, a pen, etc. with a ball point is used. However, removing the ball by breaking through the adhesive tape was found quite difficult. Since the braille system depends a lot on the manual work of the volunteers as mentioned above, excellent workability is a requisite for widening the use of the braille system and increasing the number of volunteer workers.

OBJECTS AND SUMMARY OF THE INVENTION

The present invention was contrived as an improvement over the braille board earlier proposed by the present inventor, and it facilitates an efficient printing of braille letters and offers braille stereotype which can be stored for repeated use as the original plate.

The present invention further aims at offering a print board which can be recycled to thereby reduce the cost of braille printed materials.

The present invention also aims at offering braille print board of which the original can easily be duplicated.

The first means to achieve the above mentioned objects of the present invention a braille printing board characterized in that an original printing plate made of hard plastic, etc. is continuously punched with six-dot cells each corresponding to a braille letter, a ball retaining sheet is pasted on one surface of the original print plate and a braille sheet is pasted on the other surface, braille letters are pushed up toward the ball retaining sheet from the side of the braille sheet by using either a braille pen or a braille typewriter, balls are placed in said cells, and finally a sheet is adhered to prevent balls from falling out of cells, to thereby form braille letters.

The second means to achieve said objects is a braille print board characterized in that it is provided with a ball supply plate and a dot cell guide plate in addition to the original printing plate, 6-dot cells corresponding to braille letters are punched in each of these plates, a ball-retaining sheet is adhered on said original printing plate and balls are securely placed within the cells of the supply plate, the supply plate and the cell guide plate are placed one upon another with the ball retaining sheet for the original printing plate facing downward, braille letters are raised from the cell guide plate by a pen or the like, and the balls of the ball supply plate are transferred from said original print, to thereby make braille text.

Because the original printing plate according to the present invention uses balls, the braille letters do not appear crushed despite the large number of papers printed, and a beautiful and easy-to-read finish is achieved. Further, the present invention enables printing two sheets of paper simultaneously. It is also possible to duplicate the completed original printing plate.

On the other hand, if it is unnecessary to store the original printing plate, the ball retaining sheet may be peeled to recover the balls for recycling of both the braille plate and balls.

BRIEF DESCRIPTION OF THE DRAWINGS

FIG. 1 is a perspective view of the original printing plate, FIG. 2 is a cross-sectional view along the line 2—2 of FIG. 1, FIGS. 3A to 3D are cross-sectional views to explain the steps of mounting balls in the original printing plate.

FIGS. 4 to 5C relate to the second embodiment of the invention, and more particularly FIG. 4 shows the original printing plate, the ball supply plate and the hole guide plate in perspective, and FIGS. 5A to 5C are cross-sectional views showing the steps of mounting balls in the original printing plate.

DETAILED DESCRIPTION OF THE PREFERRED EMBODIMENTS

Figure 1:
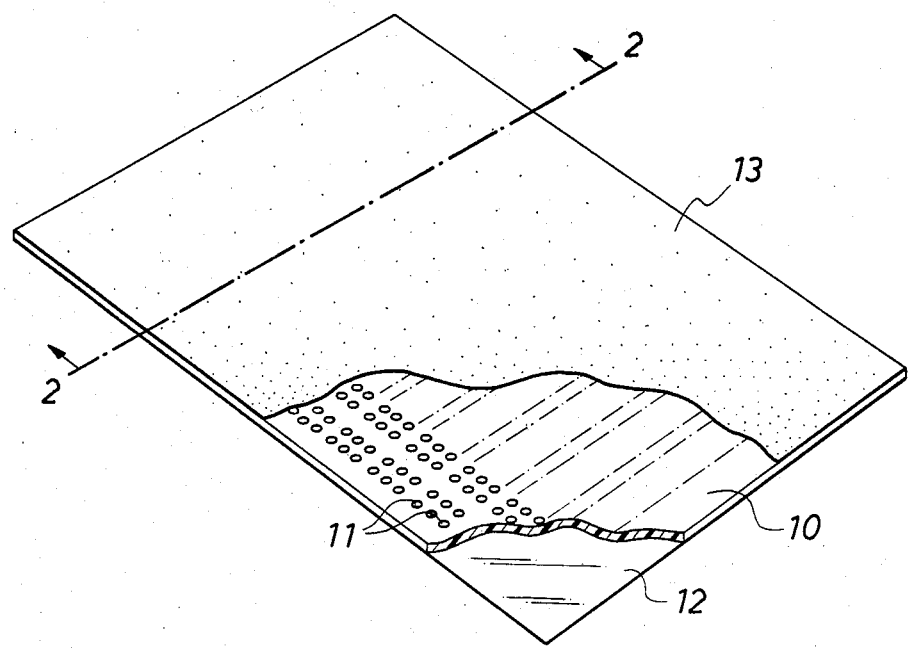
FIGS. 1 to 3D relate to a first embodiment of the invention, and more particularly
Figure 2:
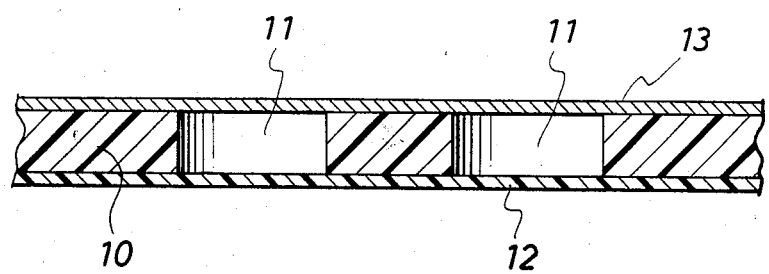
Figure 3A:
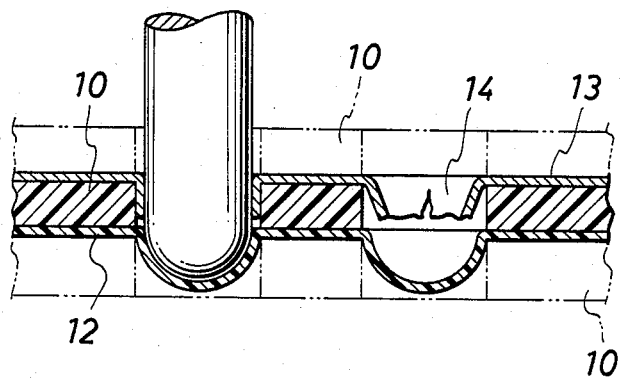

Referring to FIG. 1, an original printing plate 10 made of hard plastic is provided with dot cells 11 six dots each in continuous horizontal lines of a prescribed number. On one surface of the original printing plate 10 is pasted a retaining sheet 12 for dot balls, made of vinyl chloride or the like, and the other surface is pasted with dot hole sheet 13. The sheet 13 is coated on its outer surface with an adhesive agent which remains on the side of the paper when the sheet is peeled. In order to print out the braille letters on the original printing plate 10 thus constructed, the laminate is positioned with the outer surface of sheet 13 turned upward, and dot holes 14 are punched toward the dot cells 11 on the original printing plate 10 (FIG. 3A). Since the braille letters are to be read from left to right, the dot holes 14 are to be pressed out from right to left by using a braille pen or typewriter. The braille typewriter has a standard arrangement of braille letters, and if the dot cells 11 are formed in accordance with the standard on the dot hole sheet 13, then the braille letters can be typed out on the sheet 13 directly with the typewriter. On the other hand, since the braille pen has a round point, it may be used to press out the dot holes 14 by using the holes on the original printing plate 10 overlaid with another original printing plate as a guide (which is not pasted with the retaining sheet for dot balls) and by registering the positions of the dot holes.

Figure 3B:
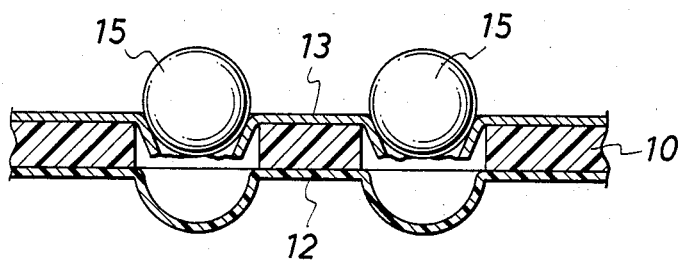

Upon completion of the pressing operation of desired dot holes 14 on all the lines of the original printing plate 10, balls 15 are placed inside the dot holes (FIG. 3B).

Figure 3C:
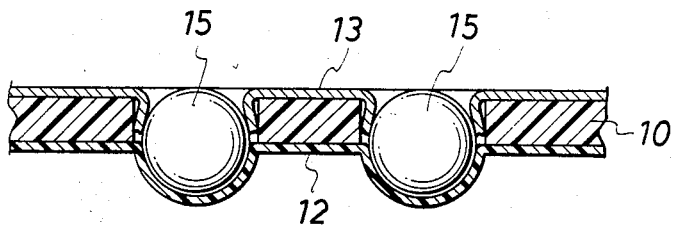
Figure 3D:
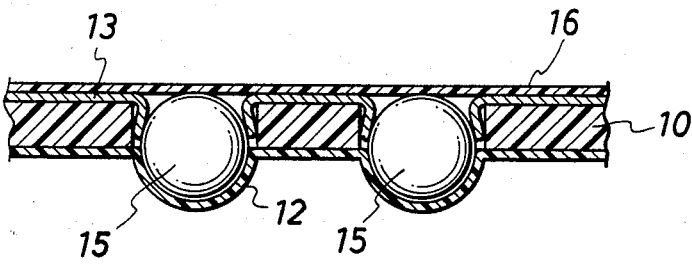

Balls 15 are then pressed in toward the ball retaining sheet 12 by a ball pressing surface in order to stabilize the balls (FIG. 3C) and then pasting the sheet 16 over the dot holes sheet 13 which has thus become flat (FIG. 3D).

The dot hole sheet 13 becomes torn, pressed into the hole 14, and becomes available to support the ball 15 inside the hole 14. The above mentioned balls are preferably made of metal for purposes of handling and economy.

The braille stereotype thus made up has braille letters on the side where the balls project, and a blind person can read the text by touching projections with his/her fingers. If there is a need for correction, one has to merely peel the retaining sheet 12 from the projection side and replace the balls 15. If balls are not yet placed inside the holes 14, the sheet 13 is restored to the original state by pressing from the back so that the hole will not be formed. If a hole is to be re-punched, it is easy to do so. This ease in proof-reading characterizes and differentiates the present invention apparatus from the conventional type products.

An embodiment of the invention which uses a plate for supplying balls and a plate for guiding holes in addition to the original printing plate for facilitating mounting of the balls will now be explained.

Figure 4:
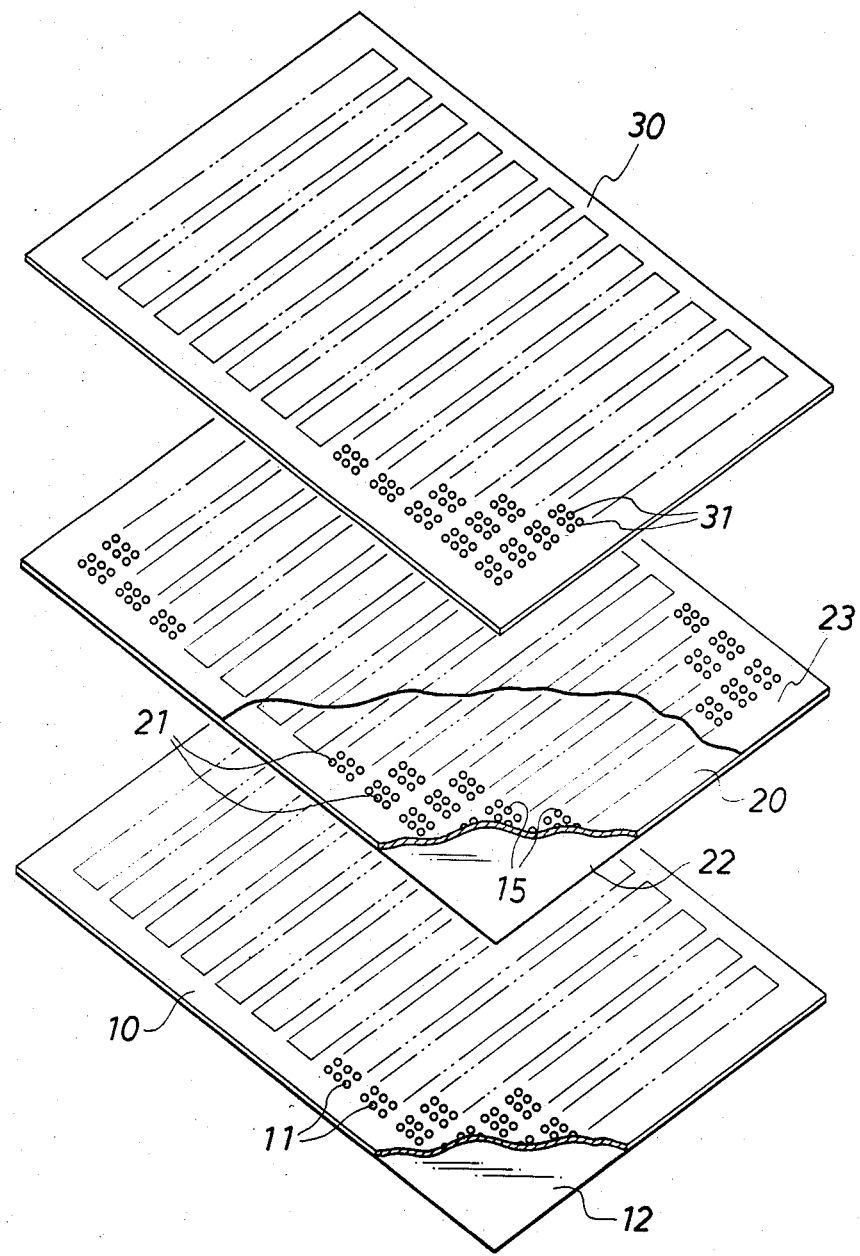

Referring to FIG. 4, an original printing plate 10, a plate for supplying balls 20 and a guide plate for holes 30 all have the cells 11, 21 and 31 in a horizontal plane continuously and also have the prescribed number of lines.

The original printing plate 10 is pasted with a dot ball retaining sheet 12 as in the foregoing. The ball supply plate 20 is pasted with the ball support sheet 22 made of nylon or polyethylene on the back thereof, and with viscous paper 23 on the surface thereof. Balls made of steel 15 are then placed in all the cells 21.

Figure 5A:
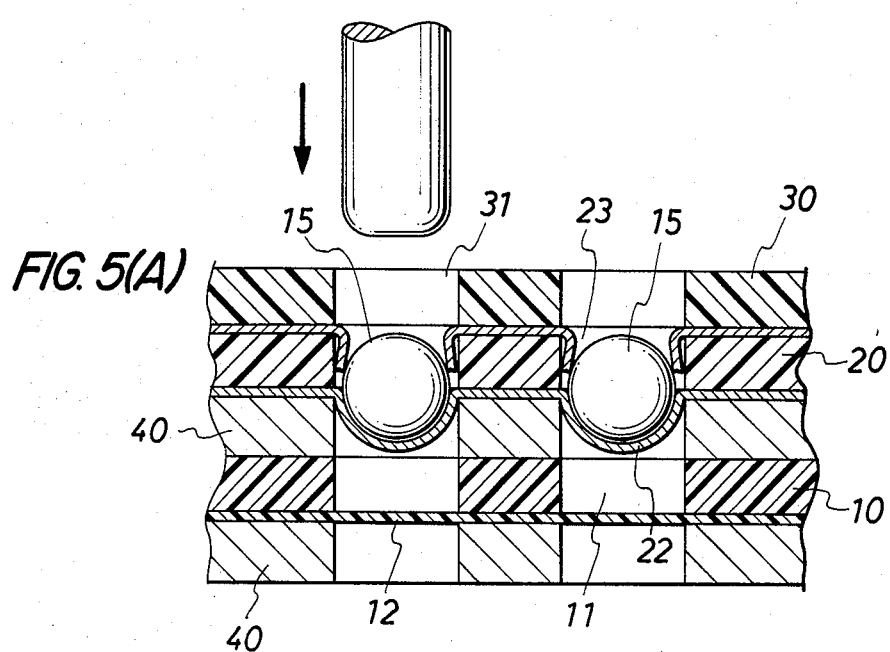
Figure 5B:
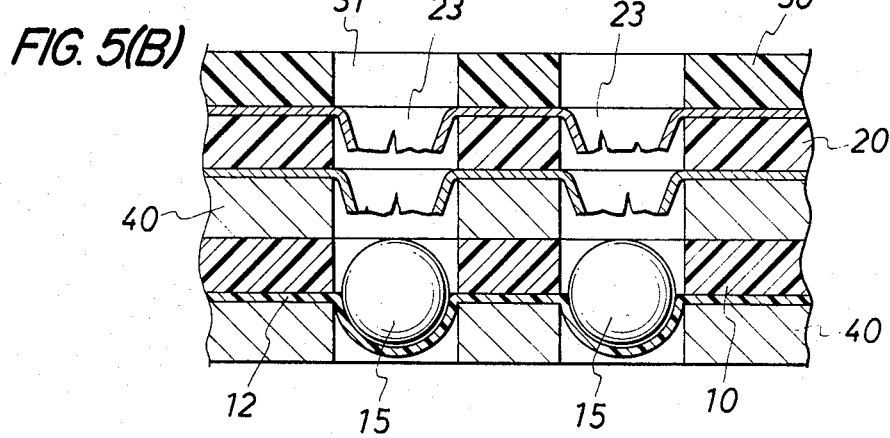
Figure 5C:
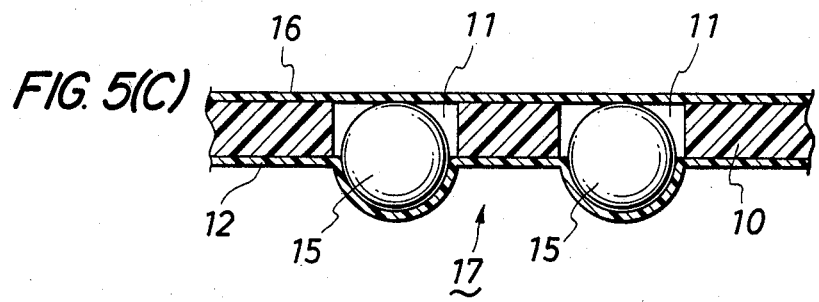

FIGS. 5A–5C show overlapping of the original printing plate 10, the supply plate 20 and the guide plate 30 in this order, provided that a plate 40 having holes throughout its surface is placed between the lower surface of the original printing plate 10 and the supply plate 20 (FIG. 5A). By pressing the balls 15 on the supply plate 20 as if to write braille letters by using a pen or the like from the guide plate 30, the balls 15 are transferred onto the printing plate 10 (FIG. 5B), and the plate 10 as taken out forms a stereotype 17 for braille printing (FIG. 5C).

The ball supply plate 20 may be recycled for making the next stereotype by supplying new balls to the portions where the balls 15 have been punched out.

The thickness of the original plate 10, the supply plate 20 and the guide plate 30 are each set to be 0.5 mm, the thickness of the ball retaining sheet 12 and the sheet 16 are each set to be 0.05 mm, the thickness of the ball retaining sheet 22 is set to be 0.1 mm, the thickness of the viscous paper 23 is set to be 0.1 mm, and the diameter of the balls 15 is set to be 1.2 mm. Therefore, the height of the braille letter rising above the stereotype 17 becomes 0.6 mm or more, thereby insuring the minimum height of 0.5 mm for the braille letter when transferred onto the braille printing paper from the stereotype.

Figure 6:
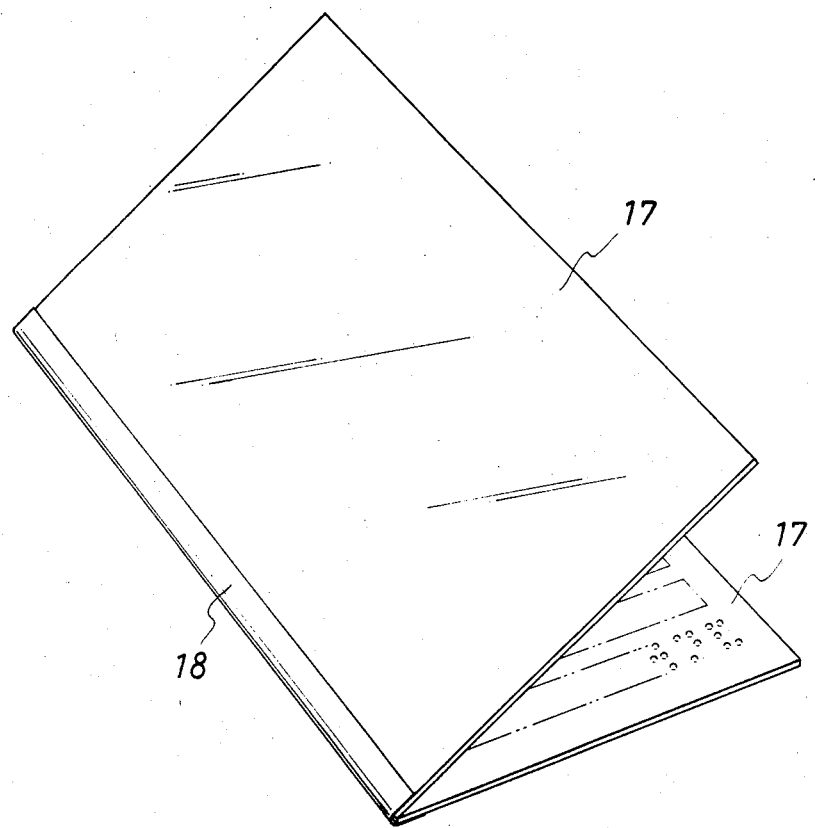
FIG. 6 is a perspective view of the braille stereotype manufactured in accordance with the second embodiment of the invention and assembled for printing.

The ball projecting side of the stereotype 17 is pressed onto the printing paper to prepare braille text. Generally, the braille text is prepared by raising the braille dots on the back of the paper on alternate lines, and is read on both the front and the back. Therefore, a stereotype 17 is prepared individually both for the surface and the back, and the edges are joined together by tape 18 or the like (FIG. 6). The braille print paper is placed between the sides of the stereotypes 17 on which the braille letters are raised, and the stereotypes 17 are pressed by the rollers, etc. to effect printing of braille letters simultaneously on the surface and the back of the braille paper.

Use of the stereotype will enable duplicating the stereotype per se. The original plate 10 is placed over the punched plate 40 with the ball retaining sheet 12 therebetween, and the ball supply plate 20 mounted with balls is placed on top thereof as well as the stereotype 17 to be duplicated. When the pressure is applied from the above, the raised letters of the original plate presses the balls on the supply plate 20 out, and are transferred onto the original plate to obtain a duplicate plate.

What we claim is:

1. A braille print board comprising:
    a print plate having a plurality of sets of 6-dot holes punched therein for forming braille letters;
    a retaining sheet pressed onto one side of said plate;
    a dot hole sheet pressed onto the other side of said plate, said dot hole sheet and said retaining sheet having braille letters in the form of punctures in said dot hole sheet and depressions in said retaining sheet, said punctures and depressions being aligned with said holes in said print plate and formed with a braille typewriter or a braille pen through said dot hole sheet;
    balls placed in said holes through said punctures; and
    a cover sheet pasted over said dot hole sheet so as to prevent said balls from dropping out of said holes.
2. A braille print device comprising:

two confronting braille print boards, each braille print board including
- a print plate having a plurality of lines of sets of 6-dot holes punched therein for forming braille letters,
- a retaining sheet pressed onto one side of said plate,
- a dot hole sheet pressed onto the other side of said plate, said dot hole sheet and said retaining sheet having braille letters in the form of punctures in said dot hole sheet and depressions in said retaining sheet, said punctures and depressions being aligned with said holes in said print plate and formed with a braille typewriter or a braille pen through said dot hole sheet,
- balls placed in said holes through said punctures, and
- a cover sheet pasted over said dot hole sheet so as to prevent said balls from dropping out of said holes; and
- a sheet of paper between said two braille print boards whereby braille text can be printed on both sides of said sheet of paper in one printing step by pressing said two braille print boards toward each other.

3. A device as in claim 2, wherein said two braille print boards are joined along the edges thereof by a piece of cloth so as to be foldable.

4. A braille print board, comprising:
- a print plate, a ball supply plate and a hole guide plate, overlaying one another and having groups of holes for six dots to correspond to a braille letter;
- a ball retaining sheet pasted over said print plate below said print plate, said ball supply plate and said hole guide plate successively overlaying said print plate above said print plate; and
- balls pressed from inside said holes in said ball supply plate by a braille pen or the like through said hole guide plate into said holes in said print plate, thereby forming a braille text.

* * * * *